United States Patent [19]

Schlanger et al.

[11] Patent Number: 5,145,138
[45] Date of Patent: Sep. 8, 1992

[54] WATER BOTTLE CAGE FOR BICYCLES

[75] Inventors: Raphael Schlanger, Norwalk; Robert H. Humphries, New Canaan, both of Conn.

[73] Assignee: Cannondale Corporation, Georgetown, Conn.

[21] Appl. No.: 720,942

[22] Filed: Jun. 25, 1991

[51] Int. Cl.⁵ ............................................. A47K 1/08
[52] U.S. Cl. .............................. 248/311.2; 224/32 R
[58] Field of Search ............... 248/311.2, 310, 313, 248/314; 224/32 R, 37, 39

[56] References Cited

U.S. PATENT DOCUMENTS

| | | | |
|---|---|---|---|
| 4,437,596 | 3/1984 | Shook | 224/32 R |
| 4,896,858 | 1/1990 | Sokolski | 248/311.2 |
| 5,060,832 | 10/1991 | Link | 248/311.2 |

FOREIGN PATENT DOCUMENTS 73722  9/1960  France ............... 248/313

*Primary Examiner*—J. Franklin Foss
*Attorney, Agent, or Firm*—Brumbaugh, Graves, Donohue & Raymond

[57] ABSTRACT

A water bottle cage for bicycles is molded from a resilient substantially rigid polymeric material and includes an elongated base portion, a bottom flange portion projecting from the base portion adjacent one end thereof and engageable by a portion of the bottom of the water bottle, and a cage portion. The cage portion has a pair of oppositely disposed arcuate segments, each joined at one end to the other end of the base portion and extending laterally thereof for engagement with the side wall of the water bottle generally circumferentially thereof and having its other end disposed generally opposite across the water bottle from the base portion, a pair of lengthwise segments, each joined at one end to the other end of a respective arcuate segment and engageable with the side wall of the water bottle, and an end segment joining the other ends of the lengthwise segments and engageable with a portion of the bottom of the water bottle. A retainer portion extends from said other end of the base portion and is engageable with the shoulder of the water bottle. The respective arcuate segments and lengthwise segments are resiliently deformable relative to each other and to the base portion so as to engage resiliently the side walls of the water bottle.

4 Claims, 2 Drawing Sheets

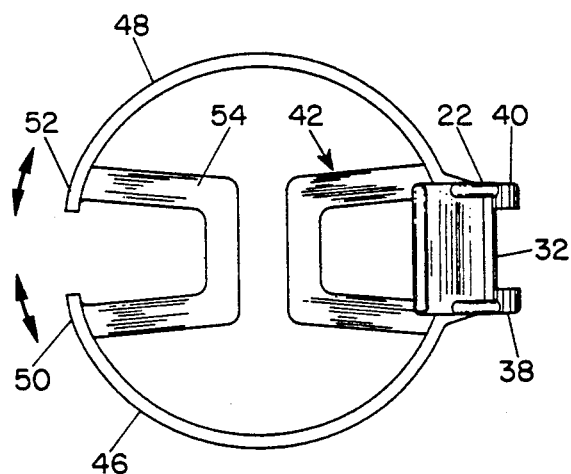
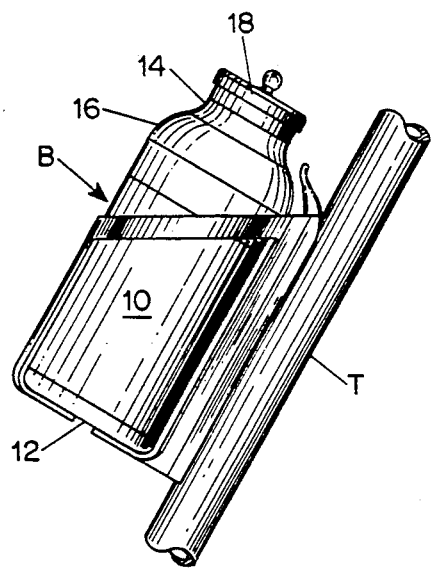
FIG. 6    FIG. 5
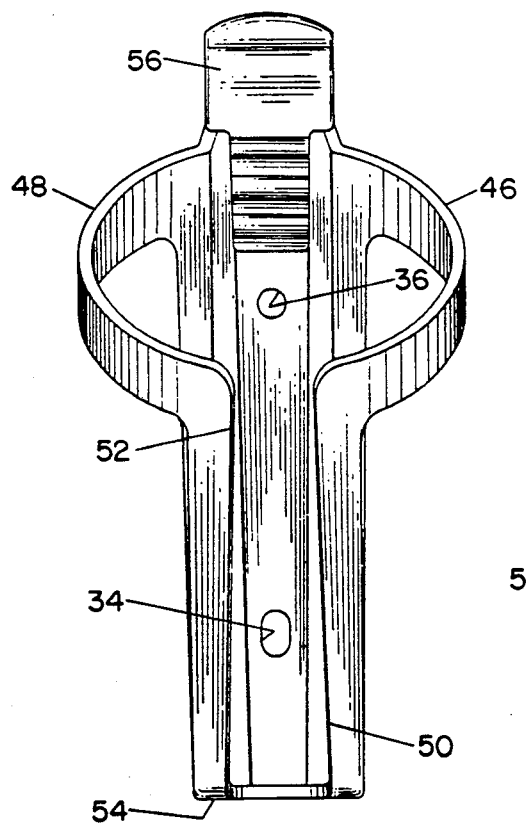
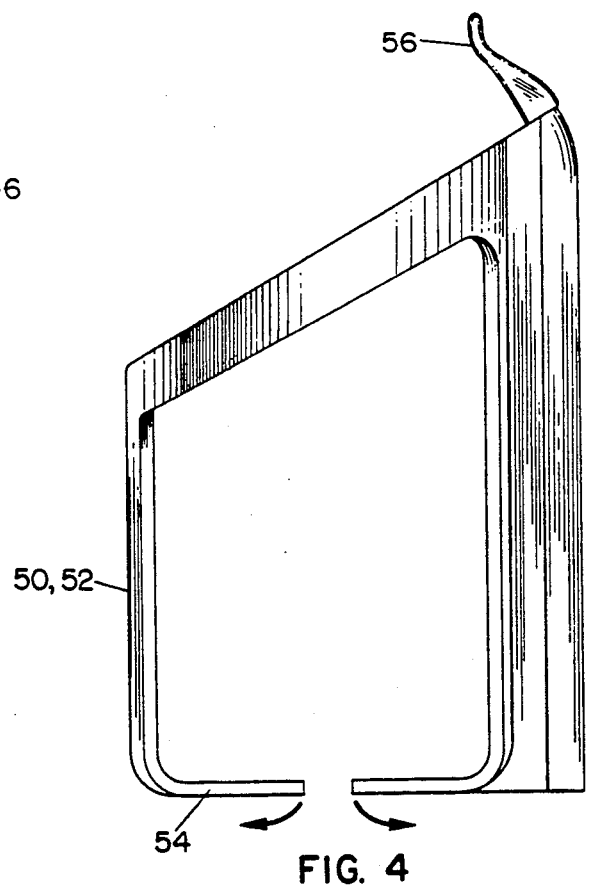
FIG. 3    FIG. 4

WATER BOTTLE CAGE FOR BICYCLES

BACKGROUND OF THE INVENTION

Water bottle cages are widely used by recreational bicyclists to carry water bottles with them when they ride. The most common type of cage in current use is made from aluminum bar stock by bending it into two generally U-shaped sections, between which the water bottle is nested. One of the U-shaped sections is welded to a bracket having holes for fasteners by which the cage is attached to the down tube or seat tube of the bicycle frame. The water bottles used with the cages have a circular cylindrical side wall, a bottom wall, a neck having a cap and a shoulder between the side wall and the neck. Water bottles of this type are marketed by several manufacturers, and while those from various suppliers are very similar, there are differences among them in the diameter of the side wall. Accordingly, not all water bottles fit into any given cage, so the purchaser has to make sure that the water bottle he or she buys will fit the cage or cages of his or her bicycle. Moreover, it is not uncommon for bicyclists riding in organized tours or some types of races to replace empty water bottles with full ones at points along the route, the full bottles being furnished at random from a supply. If the full water bottle does not fit conveniently or at all into the rider's cage, that rider has a bit of a problem. If the water bottle is too small, it is prone to bouncing out of the cage. If it is too large, it will be hard to remove it from the cage for use and return it to the cage, or it may even not be possible to put it into the cage at all.

SUMMARY OF THE INVENTION

An object of the present invention is to provide a water bottle cage that is capable of readily receiving water bottles having side walls of different diameters. Another object is to provide a water bottle cage that is simple and inexpensive to produce, durable and attractive in appearance. Still another object is to provide a water bottle cage that has a configuration that facilitates removing the water bottle for use and replacing it after use.

The foregoing and other objects are attained, according to the present invention, by a water bottle cage for bicycles for use with a water bottle of the type having a circular cylindrical side wall, a bottom wall, a neck receiving a cap and a shoulder between the side wall and neck. The cage is molded from a resilient, substantially rigid polymeric material and has an elongated base portion having a surface engageable by a lengthwise band along the side wall of the water bottle. A bottom flange portion projects from the base portion adjacent one end thereof and is engageable by a portion of the bottom of the water bottle. Attached to the other end of the base portion is a cage portion having a pair of oppositely disposed arcuate segments, each of which is joined at one end to the base portion and extend laterally thereof for engagement with the side wall of the water bottle generally circumferentially thereof an has its other end disposed generally opposite across the water bottle from the base portion, a pair of lengthwise segments, each joined at one end to the other end of a respective arcuate segment and engageable with the side wall of the water bottle, and an end segment joining the other ends of the lengthwise segments and engageable with portion of the bottom of the water bottle. A retainer portion extends from said other end of the base portion and is engageable with the shoulder of the water bottle. The respective arcuate segments and lengthwise segments are deformable relative to each other and to the base portion so as to engage resiliently the side walls of the water bottle. It is the resilient deformation of the arcuate segments and lengthwise segments that enables the cage to receive water bottles of different diameters. The resiliency of the cage also provides a gripping action on the water bottle, which helps prevent it from being accidentally ejected from the cage.

In a preferred embodiment of the invention, the arcuate segments are disposed obliquely to the base portion in a direction way from said other end of the base portion so as to define a substantially elliptical opening for reception of the water bottle having a major diameter that is greater than the diameter of the side wall of the water bottle. The greater major diameter of the elliptical opening and the oblique orientation of the entrance to the cage portion facilitate returning the water bottle to the cage after use. By orienting the water bottle with its axis somewhat oblique to the cage axis and displacing it toward the cage opening both laterally and lengthwise, the surfaces of the arcuate segments adjacent the opening guide the water bottle into position for full insertion, which is accomplished by pushing it along the cage axis.

In a preferred embodiment, furthermore, the arcuate segments and the lengthwise segments of the cage portion are bands having widths greater than their thicknesses and are disposed flatwise relative to the water bottle. The base portion is of substantially uniform cross-section along its length and includes, in cross section, a medial web portion and a flange portion on each side of the web portion, each flange portion being engageable along its length with the side wall of the water bottle.

For a better understanding of the invention reference ma be made to the following description of an exemplary embodiment, taken in conjunction with the accompanying drawings.

DESCRIPTION OF THE DRAWINGS

FIG. 3 is a front elevational view;

FIG. 4 is a side elevational view;

FIG. 5 is a top plan view; and

FIG. 6 is a side elevational view of the cage showing it as installed on a bicycle frame and with a water bottle received in it.

DESCRIPTION OF THE EMBODIMENT

Figure 1:
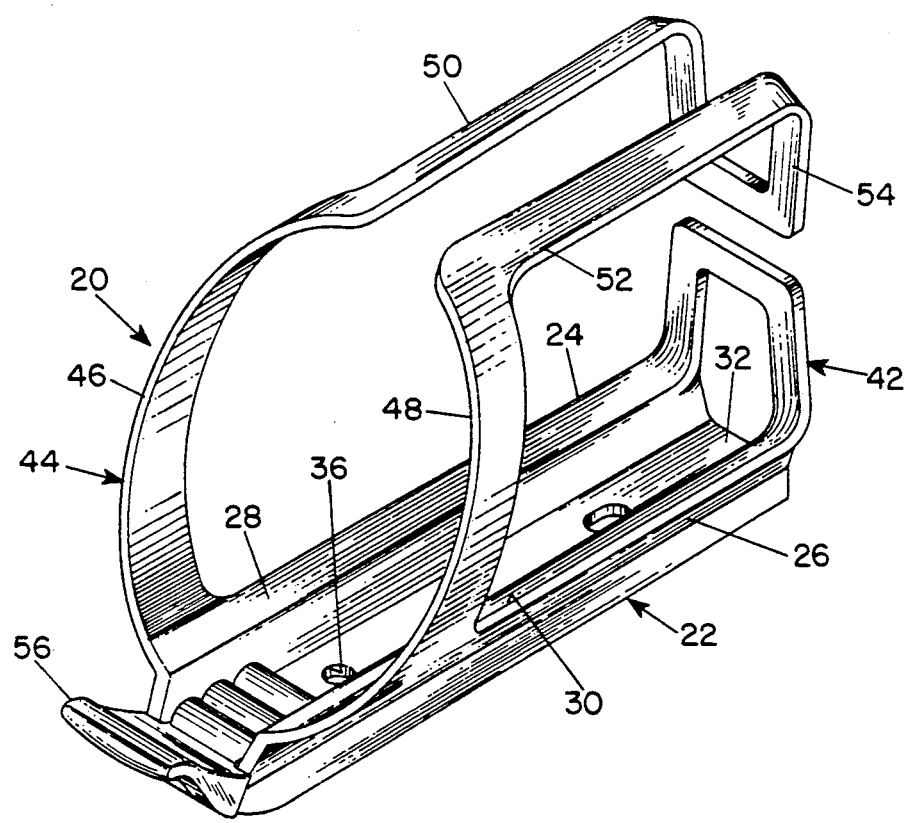
FIG. 1 is a three-quarter pictorial view ta from the side and slightly above and looking toward the top opening of the cage portion.
Figure 2:
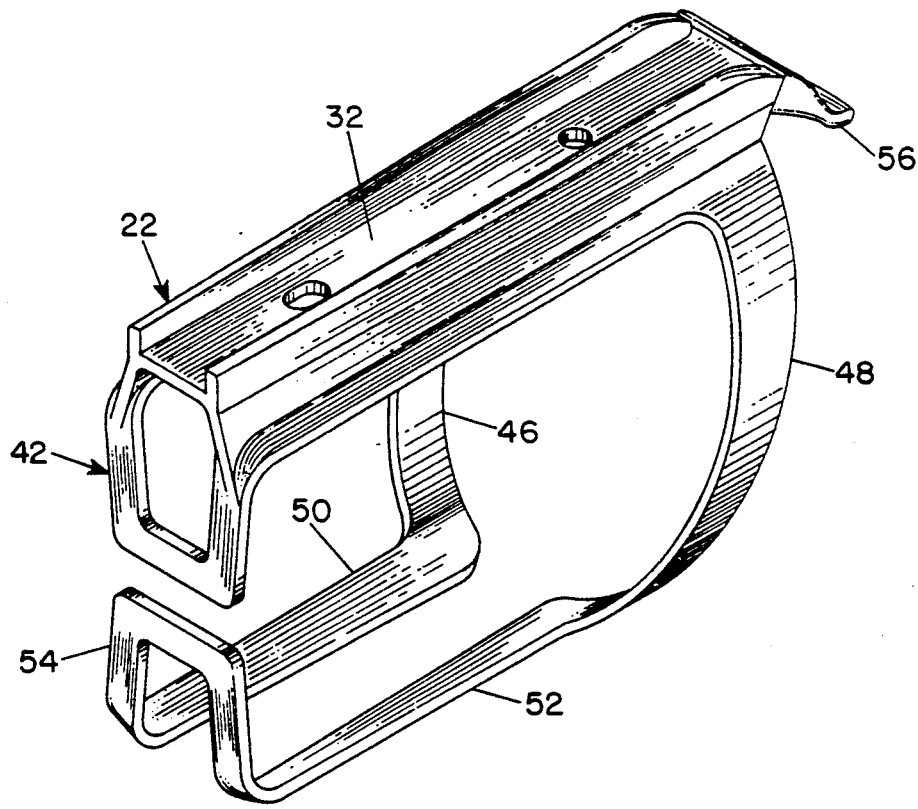
FIG. 2 is a three-quarter pictorial view taken from the side and slightly below and looking toward the bottom end.

Referring first to FIG. 6, most bicyclists who use water bottles install water bottle cages on either the down tube or seat tube T (or both) of the bicycle frame by means of mounting studs with which the bicycle frame is equipped for that purpose. Water bottles B are marketed by several suppliers in a more or less standard form, a molded plastic bottle having a circular cylindrical side wall 10, a bottom wall 12, a neck 14 that merges with the side wall at a shoulder 16, and a removable cap 18.

The embodiment of a cage 20, according to the present invention, is molded from a resilient, substantially rigid polymeric material. It includes an elongated base portion 22 having flanges 24 and 26 along each side that present lengthwise surfaces 28 and 30 that engage the side wall of the water bottle and a web 32 recessed below the flanges. Holes 34 and 36 in the web receive screws (not shown) by which the cage is fastened to the frame tube T. Ribs 38 and 40 project downwardly from the web 32 and bear against the frame tube such as to stabilize the cage laterally and longitudinally on the tube in a nested relation. A U-shaped bottom flange portion 42 projects from the base portion 22 adjacent one end thereof and is engageable by a portion of the bottom 12 of the water bottle B. A cage portion 44 is joined to the other end of the base portion 22 by a pair of oppositely disposed arcuate segments 46 and 48 that join the base portion at one end and extend generally laterally in opposite directions.. The segments 46 and 48 define an entrance opening through which the water bottle is received into the cage and engage the side wall 10 of the water bottle generally circumferentially thereof. The other ends of the arcuate segments are located generally opposite across the water bottle from the base portion.

The cage portion 20 further includes a pair of lengthwise segments 50 and 52, each of which joined at one end to the other end of a respective arcuate segment 46 and 48 and is engageable with the side wall 10 of the water bottle. A U-shaped end segment 54 joins the other ends of the lengthwise segments 50 and 52 and is engageable with a portion of the bottom 12 of the water bottle. A retainer portion 56 extends from the base portion above the arcuate segments and extends obliquely to partially overlie the opening to the cage portion such as to engage the shoulder 16 of the water bottle. To facilitate molding of the base portion and cage portion in one piece, the retainer portion 56 is molded separately and is joined to the base portion, such as by thermal or chemical bonding. (The three transverse ribs on the retainer portion 56 are ornamental and have no function in the use of the cage.)

The arcuate segments 46 and 48 are disposed obliquely to the base portion 22 in a direction way from the top end of the base portion so as to define a substantially elliptical opening for reception of the water bottle. The elliptical opening has a major diameter that is greater than the diameter of the side wall of the water bottle, which facilitates inserting the water bottle into the cage.

The arcuate segments 46 and 48 and the lengthwise segments 50 and 52 of the cage portion are bands having widths greater than their thicknesses and are disposed flatwise relative to the water bottle. This form of the arcuate segments and the lengthwise segments makes them sufficiently flexible so that they bend resiliently so as to accept water bottles of different diameters. The arcuate segments 46 and 48 bend toward and away from each other, as indicated by the arrows in FIG. 5 so as to change the diameter of the opening that they define and the spacing between the base portion 22 and the lengthwise segments 50 and 52. The lengthwise segments of the cage portion deform in the transverse direction, relative to the base portion 22, as indicated by the arrows in FIG. 4. The resilient deformation the cage portion 44 provides a frictional gripping of the water bottle, so that it held relatively securely in place in the cage. The retaining portion 56 also deforms resiliently when the water bottle is inserted into the cage and then resiles to engage the shoulder 14 of the water bottle, thereby contributing to retention of the bottle in the cage.

The easiest way to insert the water bottle into the cage is to position it so that its axis is oblique to the axis of the cage and its bottom end 12 is generally parallel to the plane of the opening into the cage defined by the arcuate segments 46 and 48. The bottle is then moved into the opening and allowed to pivot into alignment with the cage axis, guided by the base portion and the lengthwise segments of the cage portion. Before the bottle is fully received in the cage, the cage portion and the retainer portion mutually deform resiliently and then resile to embrace the water bottle in the fully received position. To remove the water bottle from the cage, the user grips the side wall or neck and pulls the bottle up and forward in a motion generally the reverse of that in which it is inserted. The resiliency of the cage allows it to deform to release the bottle.

While the embodiment is designed for mounting on a frame tube of the bicycle, the concept of the present invention of a monolithic deformable plastic cage can also be applied to designs for mounting on the handlebars in front of the head tube of the frame or under the seat. The foregoing and other variations and modifications of the embodiment will be readily apparent to those skilled in the art and are intended to be included within the scope of the present invention, as defined in the appended claims.

I claim:

1. A water bottle cage for bicycles for use with a water bottle of the type having a circular cylindrical side wall, a bottom wall, a neck receiving a cap and a shoulder between the side wall and neck, the cage being molded from a resilient substantially rigid polymeric material and having an elongated base portion having a surface engageable by a lengthwise band along the side wall of the water bottle; a bottom flange portion projecting from the base portion adjacent one end thereof and engageable by a portion of the bottom of the water bottle; a cage portion having a pair of oppositely disposed arcuate segments, each joined at one end to the other end of the base portion and extending laterally thereof for engagement with the side wall of the water bottle generally circumferentially thereof and having its other end disposed generally opposite from the base portion, said other ends of the arcuate segments being spaced apart from each other, a pair of spaced-apart lengthwise segments, each being joined at one end to the other end of a respective arcuate segment and being engageable with the side wall of the water bottle, and an end segment joining the other ends of the lengthwise segments and engageable with a portion of the bottom of the water bottle, the respective arcuate segments and lengthwise segments being deformable relative to each other and to the base portion so as to be adapted to engage resiliently the side walls of the water bottle; and a retainer portion extending from said other end of the base portion engageable with the shoulder of the water bottle.

2. A water bottle cage according to claim 1 wherein the arcuate segments are disposed obliquely to the base portion in a direction way from said other end of the base portion so as to define a substantially elliptical opening for reception of the water bottle, the elliptical opening having a major diameter that is greater than the diameter of the side wall of the water bottle.

3. A water bottle cage according to claim 1 wherein the arcuate segments and the lengthwise segments of the cage portion are bands having widths greater than their thicknesses and are disposed flatwise relative to the water bottle.

4. A water bottle cage according to claim 1 wherein the base portion is of substantially uniform cross-section along its length and includes, in cross section, a medial web portion and a flange portion on each side of the web portion, each flange portion being engageable along its length with the side wall of the water bottle.

* * * * *